July 27, 1937.  A. HORNER  2,088,374
METHOD OF TREATING FOOD PRODUCTS
Filed Dec. 26, 1934
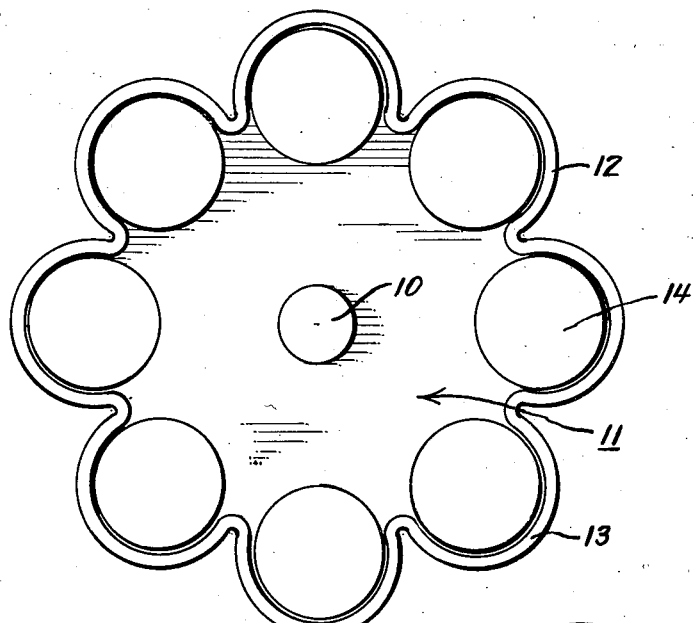
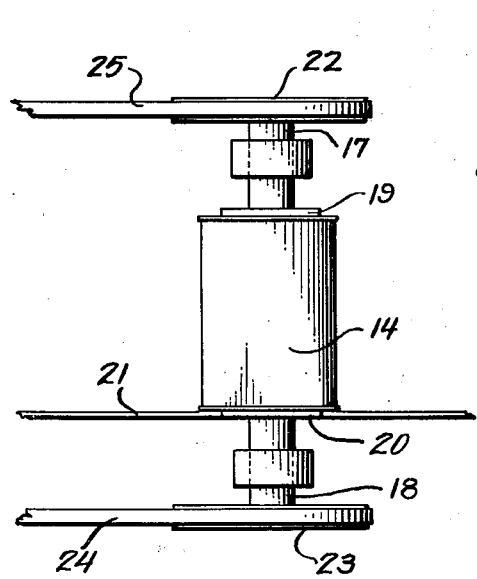
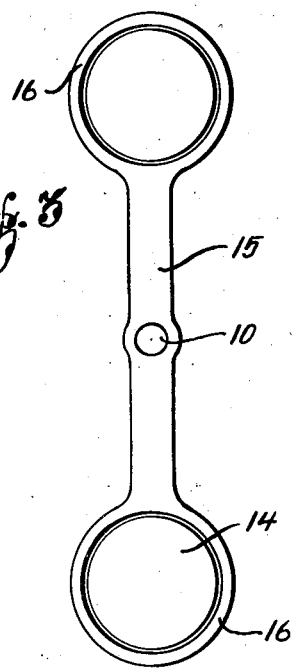
INVENTOR
ALBERT HORNER
BY *James M. Abbott*
ATTORNEY Patented July 27, 1937

2,088,374

UNITED STATES PATENT OFFICE 2,088,374

METHOD OF TREATING FOOD PRODUCTS

Albert Horner, Kapaa Kauai, Territory of Hawaii

Application December 26, 1934, Serial No. 759,191

5 Claims. (Cl. 99—154)

This invention relates to a method of treating food products and an apparatus therefor.

In the preparation and canning of food products it has been found that in some instances the canned product loses some of the desirable characteristics of the fresh fruit or vegetable, and considerable experimental work has been done in an effort to treat fruits and vegetables so that they will retain their original color and appearance, and so that they will also retain the physical structure and characteristics of the fresh products.

I have found that by the use of centrifugal force, new and useful results can be obtained in applying this force to cans of food products. When cans of food products are revolved rapidly on their longitudinal axis or when cans of food products are disposed radially around a center axis and are rapidly revolved therearound this causes new and useful results, and in many cases very beneficial results to the contents of the can can be secured. In treating tomatoes I have found that if cans of tomatoes completely processed and ready for consumption are treated by centrifugal force that the tomatoes in the can become a deep and brilliant red color, many shades redder and deeper than they were prior to being so treated.

I have also found that in the handling of canned peas that the peas so handled become much tenderer without being in any sense disturbed or distorted by the rapid centrifugal motion. The same is true of canned beets, canned corn, and other food products. The same results are obtainable with many food products adding to the same character and salability through producing improvement in color, texture, and palatability.

The present invention contemplates the provision of a means adapted to rapidly rotate a can of food products, either on its own axis, or to gyrate around an axis exteriorly of the can, and by which actions force is set up in the product due to the centrifugal motion which will act upon the structure of the product in the desirable manner hereinbefore specified.

The invention is illustrated by way of example in the accompanying drawing in which:

Figure 1 is a view in plan showing one form of the present invention by which a plurality of cans may be simultaneously treated in a desirable manner by the present process.

Fig. 2 is a view in plan showing another form of the invention for treating cans of food products.

Fig. 3 is a view in side elevation showing a device for separately rotating the cans of food products upon their own axis.

Referring more particularly to Fig. 1 of the drawing, 10 indicates a vertical shaft upon which is mounted a wheel 11. This wheel is bounded around its outer edge with a scalloped wall 12 having a plurality of semi-circular wall sections 13. These sections are described by arcs struck from a circle concentric with the axis of shaft 10 and spaced equally along the circle. The arc describing the inner wall of the arcuate wall sections agrees with the arc describing the outer circumference of a can indicated at dotted lines 14 and which can is designed to seat within one of the scallops. It will be evident that a can may be positioned within each of the scallops and that it will be held in this position due to centrifugal force set up by rotation of the wheel 11.

In the form of the invention shown in Fig. 2 of the drawing, the shaft 10 is fitted with radial arms 15, each carrying a cylindrical pocket 16 at its end designed to receive a sealed can of food product.

In the form of the invention shown in Fig. 3 of the drawing a pair of vertically aligned shafts 17 and 18 are disclosed which carry upper and lower chuck plates 19 and 20. A can 14 moves on to a guide table 21 and between the chuck plates 19 and 20 where it is frictionally engaged by these plates and where it is caused to spin upon its own axis as driven by pulleys 22 and 23, respectively. The pulleys are fitted with suitable belts 24 and rotate so that the can is given a spinning rotation at high speed.

In the operation of the apparatus as shown in the drawing, it has been found that a suitable rotation for the types of the invention disclosed in Figs. 1 and 2 is approximately 1200 revolutions per minute, and that in the form of the invention shown in Fig. 3 of the drawing, where the can rotates on its own axis, the speed of rotation may be desirably maintained at from 6000 to 8000 revolutions per minute. The rate of rotation of the various elements, however, depends to some extent upon the food products being treated, and this may be ascertained for individual products.

In operation food is canned in the manner customary consistent with good canning practice, and preferably before cans are labeled they are placed in a form of the apparatus shown in the drawing, after which centrifugal force is set up in the can by its movement around an axis eccentric to the can or concentric therewith. This movement of rotation sets up within the can a high pressure due to centrifugal force. This pressure acts to remove objectionable occluded gases contained within the cellular structure of the food and tends to press the air and gas outwardly from the cell structure so that the cells will be substantially exhausted of their contents. When the rotational action is discontinued and the cell structure of the food is relieved of the influence of centrifugal force the liquid within the can will be drawn into the re-expanding cells to take the place of the occluded gases which had been expelled. It will be recognized that where air is contained in food, such as pineapple, tomatoes, and other foods having a characteristic color, this air contained in the foods is opaque in nature, and it will hide the pigmentation which is behind the air cells and to the observer the food will appear white. Thus when the air or other gas is pressed out of the food cells and the cells are refilled with the fluid which contains the pigment the color of the foods is intensified. It has also been found that this centrifugal action set up in the food product increases its tenderness. The centrifugal action is maintained for a suitable period of time, having direct relation to the food being treated, and during which time it has been found that the physical structure of the food product is increased in tenderness without disrupting or producing any undesirable condition in the physical structure of the product, and at the same time improving the color of the product which makes it possible for packed fruits and vegetables to have a higher commercial value than would otherwise be the case.

It will thus be seen that by the method and apparatus here disclosed it is possible to rapidly and cheaply treat food products in a manner to improve their color and structure.

While I have shown the preferred method of treating food products to obtain the results desired, and the preferred forms of the apparatus, it will be understood that various changes may be made in the steps of the method and the details of construction of the apparatus, by those skilled in the art, without departing from the spirit of the invention as claimed.

Having thus described my invention, what I claim and desire to secure by Letters Patent is:

1. A method of treating food which has been canned ready for the market which consists in rapidly rotating the can in order to set up a desired degree of centrifugal force within the mass thereof.

2. A method of treating food products to improve their qualities, said products having already been canned for the market which method consists in rotating the cans and their product rapidly around an axis with the cans radially disposed thereof and in a condition of centrifugal balance.

3. A method of treating food products to improve their qualities, said products having already been canned for the market, which method consists in rapidly rotating the can and its contents around its own longitudinal axis.

4. A method of improving food products having a liquid content associated with occluded gases, which consists in hermetically sealing the product within a container and then rotating the container around an axis with sufficient speed to set up centrifugal force within the container to produce migration of occluded gases and associated liquid from the cell structure of the product, and thereafter bringing the container to rest to permit the liquid to re-enter the cell structure.

5. A method of treating a cellular food product, which product contains food juices and occluded gases, said method consisting in hermetically sealing the product in a container, thereafter rotating the container around an axis to set up centrifugal action in the product whereby the juices and gases will be caused to migrate from the cell structure and thereafter bringing the container to rest so that the previously evacuated cells may expand and draw in the liquids.

ALBERT HORNER.